United States Patent
Giraud et al.

(10) Patent No.: US 7,213,626 B2
(45) Date of Patent: May 8, 2007

(54) HEAVY VEHICLE TIRE WITH CROWN REINFORCEMENT HALF-PLIES

(75) Inventors: Jacques Giraud, Beaumont (FR); Marie-Claude Palgen, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/757,984

(22) Filed: Jan. 16, 2004

(65) Prior Publication Data

US 2004/0144469 A1   Jul. 29, 2004

Related U.S. Application Data

(63) Continuation of application No. PCT/EP02/07621, filed on Jul. 9, 2002.

(30) Foreign Application Priority Data

Jul. 16, 2001   (FR) ................................. 01 09573

(51) Int. Cl.
  *B60C 9/20* (2006.01)
  *B60C 9/18* (2006.01)
(52) U.S. Cl. ........................ 152/534; 152/526; 152/535
(58) Field of Classification Search ................ 152/534, 152/535, 526
  See application file for complete search history.

(56) References Cited

U.S. PATENT DOCUMENTS

| 4,215,736 A |   | 8/1980  | Herbelleau |            |
|-------------|---|---------|------------|------------|
| 5,111,864 A |   | 5/1992  | Nakano et al. |         |
| 5,465,773 A | * | 11/1995 | Kadota et al. | ........... 152/526 X |
| 5,553,646 A | * | 9/1996  | Ando et al.   | ............. 152/526 X |
| 6,499,523 B1 | * | 12/2002 | Giraud    | ........................ 152/534 |
| 6,585,020 B2 | * | 7/2003  | Bondu     | ......................... 152/534 |
| 6,598,639 B2 | * | 7/2003  | Comps et al. | .......... 152/534 X |

FOREIGN PATENT DOCUMENTS

FR         1 437 569       5/1966
WO      WO 00/54992       9/2000

* cited by examiner

*Primary Examiner*—Adrienne C. Johnstone
(74) *Attorney, Agent, or Firm*—Buchanan Ingersoll & Rooney PC

(57) ABSTRACT

The invention relates to a tire with radial carcass reinforcement, intended for equipping a heavy vehicle such as a transport vehicle or construction machinery. It refers in particular to a tire having an axial width greater than 37 inches. The tire according to the invention has a working crown reinforcement, composed of at least two continuous working plies and completed on each side of the circumferential center plane by at least two half-plies whereof the metal reinforcing elements form angles greater than the smallest of the angles of the reinforcing elements of the continuous plies with the circumferential direction, with that half-ply extending axially furthest outwards being in contact with the axially widest continuous working crown ply, and the two half-plies radially covering the axially outer end of the said axially widest working ply.

9 Claims, 2 Drawing Sheets

HEAVY VEHICLE TIRE WITH CROWN REINFORCEMENT HALF-PLIES

This application is a continuation of PCT/EP02/07621 filed on Jul. 9, 2002, which claims priority from patent application Ser. No. 01/09573 filed in France on Jul. 16, 2001, the entire content of which is hereby incorporated by reference.

BACKGROUND OF THE INVENTION

The invention relates to a tire with radial carcass reinforcement, intended for equipping a heavy vehicle such as a transport vehicle or construction machinery. It refers in particular to a tire having an axial width greater than 37 inches.

A tire of this kind, usually intended to bear heavy loads, comprises a radial carcass reinforcement and a crown reinforcement composed of at least two working crown plies which are formed by non-extensible reinforcement elements that cross from one ply to the next, forming equal or unequal angles of between 10° and 45° with the circumferential direction.

Crown reinforcements of radial tires, in particular as regards very large tires, undergo pronounced deformations which give rise to longitudinal and transverse shear stresses between the edges of two crossed plies (the longitudinal shear is greater than the transverse shear when the cords of crossed plies are at small angles with the circumferential direction) at the same time as a delaminating stress, a radial stress tending to separate the edges of two plies radially from one another. The said stresses are primarily due to the inflation pressure of the tire, which has the effect that the so-called belt pressure between the carcass reinforcement and the crown reinforcement tends to cause the said crown reinforcement to expand circumferentially. The said stresses are moreover due to the load borne by the tire during travel, once a contact surface is produced between the ground and the tire. The said stresses are, furthermore, due to the slip angle of the tire during travel. These stresses produce cracks in the rubber mix adjoining the end of the shortest ply, and these cracks are propagated through the said mix, having an adverse effect on the service life of a crown reinforcement and hence of the tire.

A clear improvement to the service life has been achieved by using in the crown reinforcement at least one protective crown ply having an axial width greater than the width of the axially widest working ply.

The term "axial" means a direction parallel to the axis of rotation of the tire, and the term "radial" means a direction intersecting the axis of rotation of the tire and perpendicular thereto. The axis of rotation of the tire is the axis about which it turns in normal use. The circumferential center plane is a plane perpendicular to the axis of rotation of the tire, dividing the tire into two halves. A radial plane is a plane containing the axis of rotation of the tire.

Another solution, as described in the patent FR 2 421 742, consists in more favorable distribution of the stresses which give rise to separation between working crown plies and which result from the slip angle of the tire, by multiplying the number of working plies.

Multiplying the working plies is not without disadvantages, in particular at the center of the crown reinforcement, where the number of plies has a direct influence on the stiffness in flexure of the crown of the tire. When this stiffness increases, the result is that impacts on the crown of the tire, such as in particular on passing over large stones, may lead to irreparable damage to the tire as a result of this increased stiffness.

Patent application WO 00/54992 has moreover proposed, as a way of avoiding this disadvantage, making a working crown reinforcement composed of at least three continuous working plies and at least one half-ply on either side of the circumferential center plane, disposed between the edges of at least two radially adjacent continuous working plies, and whereof the special feature is in particular the fact of forming an angle with the circumferential direction greater than 25° and greater by an amount of between 5° and 15° than the largest of the angles of the continuous working plies. The results obtained with this type of structure have been perfectly satisfactory for the sizes of tire tested.

BRIEF SUMMARY OF THE INVENTION

In their research, and in particular in researching the manufacture of larger tires, in particular tires whereof the axial width is greater than 50 inches, the inventors aimed to define a crown structure for tires for heavy vehicles which allows a satisfactory service life to be obtained, in particular by improving the circumferential and transverse stiffness values in order to restrict the shear stresses while maintaining flexibility of the crown.

This object has been achieved in accordance with the invention by a tire for a heavy vehicle, comprising a radial carcass reinforcement radially surmounted by a working crown reinforcement, composed of at least two continuous working crown plies formed by metal reinforcing elements which cross from one ply to the next, forming angles $\alpha$, $\alpha'$ of between 10° and 35° with the circumferential direction, the working crown reinforcement being completed on each side of the circumferential center plane by at least two half-plies whereof the metal reinforcing elements form angles $\alpha$, $\alpha'$ greater than the smallest of the angles $\alpha$, $\alpha'$ with the circumferential direction, with that half-ply extending axially furthest outwards being in contact with the axially widest continuous working crown ply, and the two half-plies radially covering the axially outer end of the said axially widest working ply.

A tire as just defined, according to the invention, that is to say having a crown reinforcement as described, enables the service life of tires for heavy vehicles to be improved. It has in fact been found that the structures proposed reduce the shear stresses while maintaining the flexibility of the tire, particularly at its crown, enabling good impact resistance to be obtained, which in turn has a favorable effect on the service life of the tire.

The continuous plies and the working half-plies are preferably composed of non-extensible metal reinforcing elements, such that the function of hooping, or binding, the carcass ply is ensured as effectively as possible.

According to an advantageous embodiment of the invention, at least one of the half-plies has a zone covering the end of the narrowest continuous crown ply. According to an embodiment of this kind, it is possible to further improve distribution of the forces in the crown reinforcement as a whole by optimizing the coupling between plies.

Also advantageously, the reinforcing elements of one of the half-plies are at an angle at least 10° greater than the smallest of the angles $\alpha$, $\alpha'$. A ply of this kind in particular enables a contribution to be made to the transverse stiffness of the tire without having an adverse effect on flexibility.

According to a preferred embodiment of the invention, in order to improve the circumferential stiffness of the tire while increasing the transverse stiffness, the reinforcing elements of the half-plies cross one another.

In a manner known per se, in particular to improve the resistance of the tire to cuts and perforations, the working crown reinforcement is completed by a protective reinforcement. The latter is advantageously composed of at least two plies of resilient metal reinforcing elements. Variant embodiments of the invention provide protective plies formed by strips partly covering one another. Whatever the type of protective plies used, the resilient reinforcements used may be elements arranged rectilinearly or in a sinusoidal shape.

At least one of the said protective plies, preferably the radially inner ply, has an axial width greater than the axially largest width of the continuous working plies. Also advantageously, the said protective ply covers all the continuous working plies and working half-plies.

According to an advantageous variant on the invention, the radially outer protective ply has an axially outer end between the axially outer end of the half-ply extending axially least far outwards and the axially outer end of the widest continuous working ply.

Also preferably, the reinforcing elements of the protective plies cross one another.

BRIEF DESCRIPTION OF THE DRAWING

Other details and advantageous features of the invention will become apparent below from the description of example embodiments of the invention, with reference to FIGS. 1 to 4, in which.

DETAILED DESCRIPTION OF THE INVENTION

Figure 2:
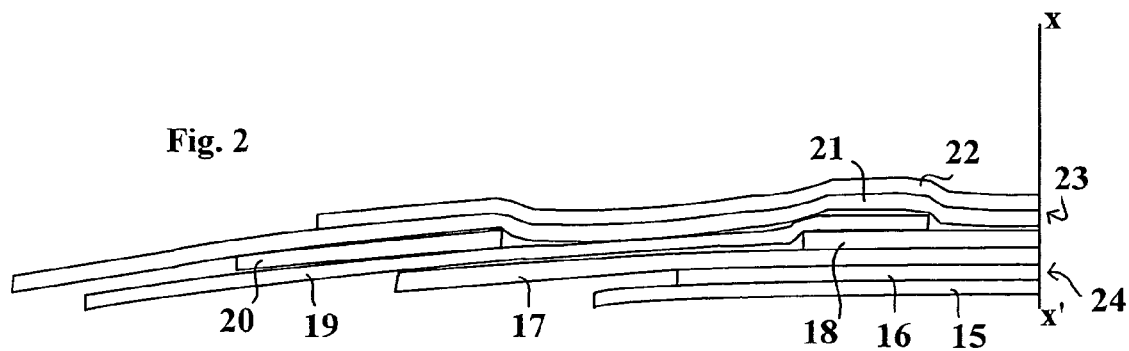
FIG. 2 shows a diagrammatic illustration in radial section of a first crown structure according to the invention.
Figure 3:
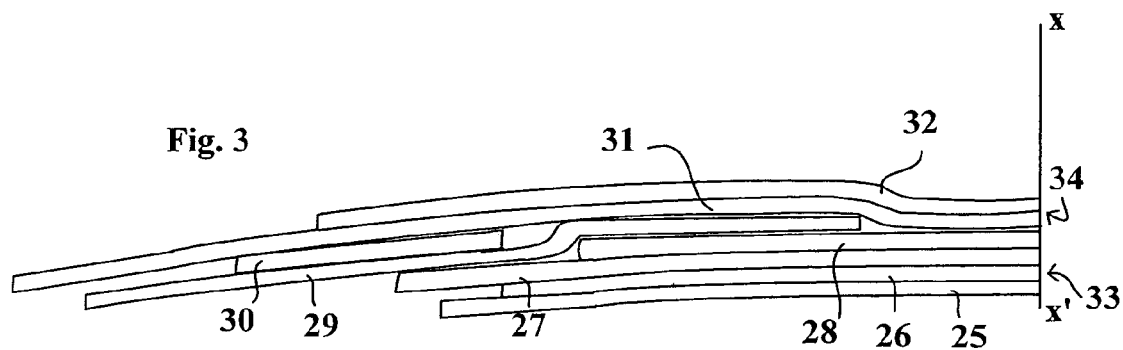
FIG. 3 shows a diagrammatic illustration in radial section of a second crown structure according to the invention.
Figure 4:
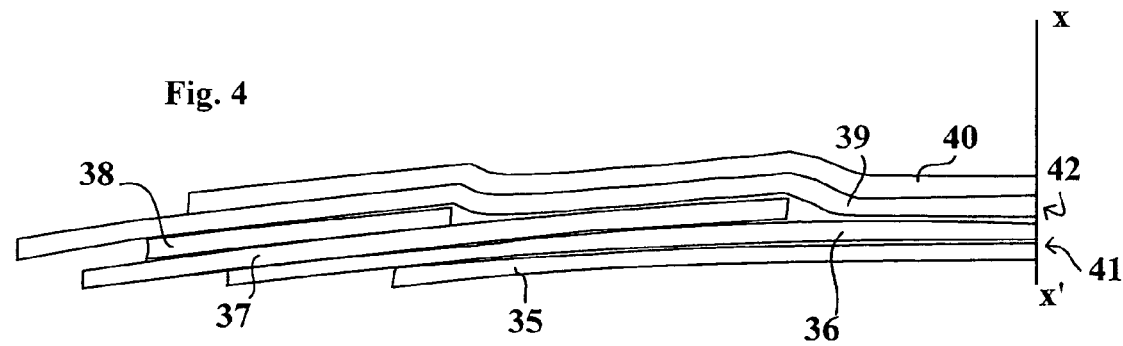
FIG. 4 shows a diagrammatic illustration in radial section of a third crown structure according to the invention.

The figures are not shown to scale, to simplify understanding thereof. FIGS. 2 to 4 show only half of the structures, which extend symmetrically with respect to the axis XX', which shows the circumferential center plane of a tire.

The dimensional values given are theoretical values, that is to say they are reference values given on manufacture of the tires; the actual values may be slightly different, in particular because of the uncertainty associated with the manufacturing process for this type of tire.

Moreover, as regards the angles of the ply reinforcements, the values given are minimum values, that is to say the values corresponding to the zone of a ply closest to the center axis of the tire. In reality the angle of the said reinforcements varies in dependence on the axial direction of the tire, in particular as a result of the camber thereof.

Figure 1:
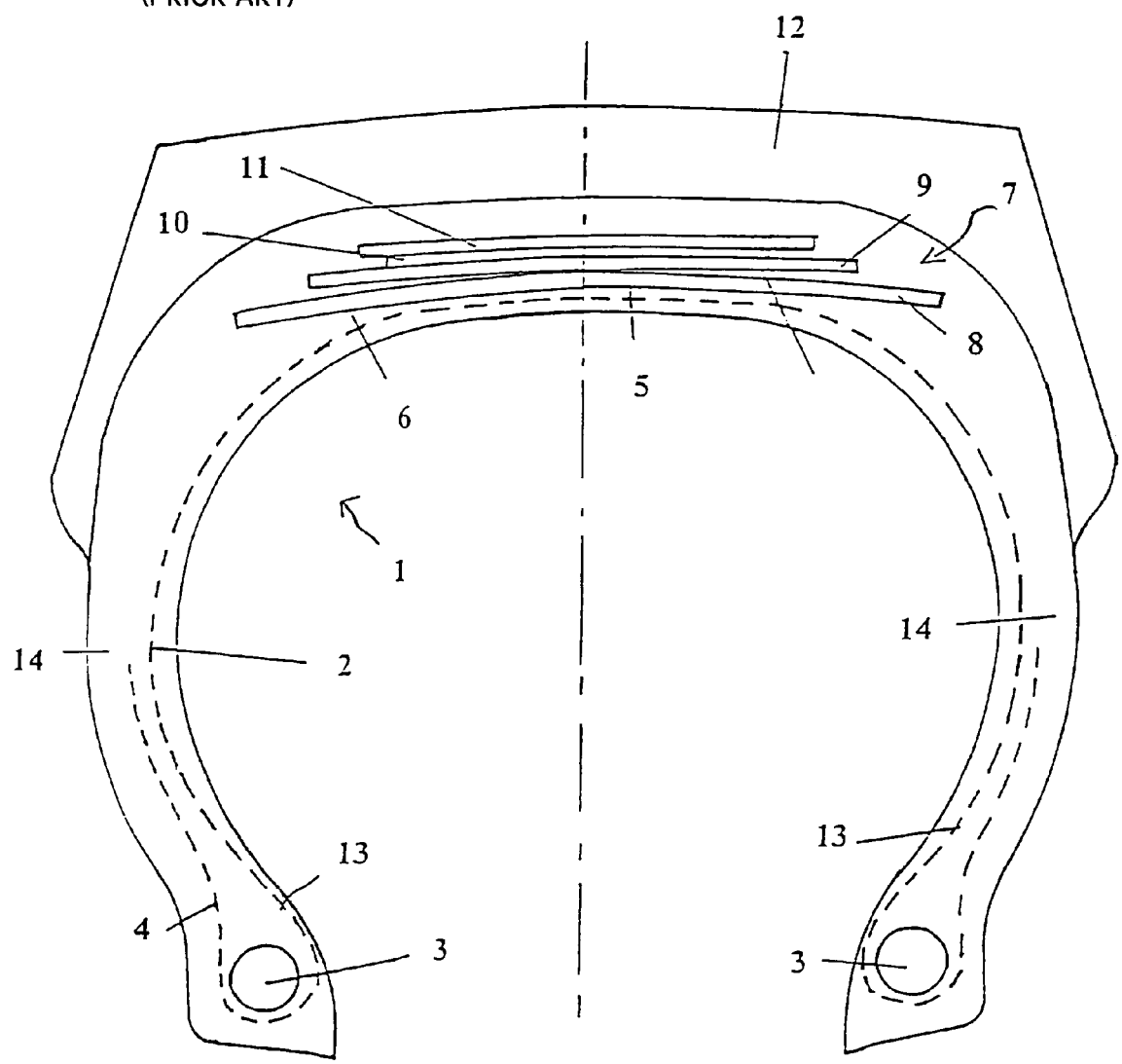
FIG. 1 shows a diagram in radial section of a tire for construction machinery.

In FIG. 1 a radial section through a tire 1 commonly used in construction machinery is shown diagrammatically.

This tire 1 is a large tire whereof the H/S ratio is 0.80, where H is the height of the tire on the rim and S is the maximum axial width of the tire when the latter is mounted on its operating rim and inflated to its recommended pressure.

This tire 1 comprises a carcass reinforcement 2 composed of a ply of non-extensible metal cords made of steel, anchored in each bead to a bead wire 3 in order to form an upturn 4 whereof the end is located substantially at the point of greatest axial width of the carcass reinforcement 2. The carcass reinforcement 2 is radially surmounted by layers 5 and profiles of rubber mix 6, and then by a crown reinforcement 7. The said crown reinforcement 7 is conventionally composed, in the case of FIG. 1, on the one hand of two plies 8, 9, called working plies, and on the other of two protective plies 10, 11. The working plies 8, 9 are themselves composed of non-extensible steel cords parallel to one another in each ply 8, 9, and crossing from one ply to the next to form angles which may be between 15° and 45° with the circumferential direction. The protective plies 10, 11 are generally composed of resilient metal cords made of steel, parallel to one another in each ply 10, 11 and crossing one another from one ply 10 to the next 11, also making angles which may be between 15° and 45°. The cords of the radially outer working ply 9 conventionally cross the cords of the radially inner protective ply 10. Finally, the crown reinforcement is surmounted by a tread 12 which is connected to the two beads 13 by two sidewalls 14.

In FIG. 2, a stack according to the invention of plies 15 to 22 forming a working crown reinforcement 24 of a tire, this reinforcement being surmounted by a protective reinforcement 23, is shown diagrammatically. The carcass reinforcement and the different zones of rubber mix are not shown in this FIG. 2 or the following figures, in order to simplify understanding of the invention.

The working reinforcement 24 thus comprises in the first instance the four axially continuous plies 15, 16, 17 and 18. These plies have the respective theoretical widths $L_{15}$, $L_{16}$, $L_{17}$, $L_{18}$ equal to 0.40 $S_0$, 0.35 $S_0$, 0.65 $S_0$, 0.25 $S_0$, where $S_0$ is the maximum axial width of the carcass reinforcement when the latter is mounted on its operating rim and inflated to its recommended pressure.

These four continuous working plies are formed from non-extensible metal cords which are parallel to one another in each ply 15 to 18 and cross from one ply 15, 17 to the next 16, 18, forming theoretical minimum angles $\alpha_{15}$, $\alpha_{16}$, $\alpha_{17}$ and $\alpha_{18}$ respectively equal to +15°, −22°, +22° and −22° with the circumferential direction of the tire.

The working crown reinforcement is then radially completed by superposing two half-plies 19, 20. As explained above, these two half-plies are located symmetrically with respect to the circumferential center plane on that part of the stack of the tire which is not shown. These two half-plies also have non-extensible metal cords which are parallel to one another and cross from the ply 19 to the ply 20 at theoretical minimum angles $\beta_{19}$, $\beta_{20}$ which are respectively equal to −22° and +34°.

The theoretical axial distance separating the radial plane from the inner end of the half-ply 19 closest to the said circumferential center plane is equal to 0.07 $S_0$.

The two half-plies 19, 20 extend axially further outwards than the axially widest continuous working ply 17 of the continuous working plies.

Moreover, according to this embodiment of FIG. 2, the half-ply 19 which is the only one to be in direct contact with the continuous working plies 17, 18 has cords which cross those of the ply 17, with respect to which the said half-ply 19 has the largest area of cover.

The cover zones between the half-plies and the continuous working plies, including that between the half-ply 19 and the axially least extensive continuous working ply 18, are sufficiently large to ensure continuity of the forces.

According to other features of the invention, the half-ply 19 extending axially furthest outwards is in contact with the axially most extensive continuous working ply 17. Moreover, the two half-plies 19, 20 cover the axially outer end of the said axially most extensive continuous working ply 17.

The protective reinforcement 23, which radially covers the working crown reinforcement 24, is formed from two plies 21, 22 comprising resilient steel cords. Those cords which have a relative elongation at least equal to 4% under a tractive force equal to the breaking load are called resilient, whereas cords are called non-extensible when their relative elongation, measured at 10% of the breaking force, is less than 0.2%. The cords of the said two plies cross from one ply 21 to the other 22, forming theoretical minimum angles respectively equal to −24° and +24° with the circumferential direction. The cords of the protective ply 21 which is radially closest to the working reinforcement cross the cords of the working half-ply 20 radially furthest from the carcass reinforcement; in accordance with other variant embodiments, the invention provides for inverting the radial order of the two protective plies, while the cords of the said plies remain crossed with one another.

The axial width of the widest protective ply 21 is such that it covers the axial width of the working reinforcement 24; that is to say that it radially covers all the working plies, as a function of its axial extent. In other words, the end of the widest protective ply 21 is axially outside the half-ply 19.

The axially outer end of the narrowest protective ply 22 is between the axially outer end of the half-ply 20 extending axially least far outwards and the end of the widest continuous working ply 17.

FIG. 3 shows a diagrammatic illustration in radial section of a different crown reinforcement structure according to the invention. According to this second illustration of the invention, the stack has plies 25 to 32 forming a working crown reinforcement 33 of a tire, this reinforcement being surmounted by a protective reinforcement 34.

The working reinforcement 33 comprises the four axially continuous plies 25, 26, 27 and 28. These plies have respective theoretical widths $L_{25}$, $L_{26}$, $L_{27}$, $L_{28}$ equal to 0.50 $S_0$, 0.45 $S_0$, 0.55 $S_0$, 0.40 $S_0$, where as mentioned above $S_0$ is the maximum axial width of the carcass reinforcement when the latter is mounted on its operating rim and inflated to its recommended pressure.

These four continuous working plies are formed from non-extensible metal cords which are parallel to one another in each ply 25 to 28 and cross from one ply 25, 27 to the next 26, 28, forming theoretical minimum angles $\alpha_{25}$, $\alpha_{26}$, $\alpha_{27}$ and $\alpha_{28}$ respectively equal to +18°, −24°, +20° and −20° with the circumferential direction of the tire.

The working crown reinforcement 33 is then radially completed by superposing two half-plies 29, 30. As above, these two half-plies are located symmetrically with respect to the circumferential center plane on that part of the stack of the tire which is not shown. These two half-plies also have non-extensible metal cords which are parallel to one another and cross from the ply 29 to the ply 30 at theoretical minimum angles $\beta_{29}$, $\beta_{30}$ which are respectively equal to −23° and +34°.

The theoretical axial distance separating the radial plane from the inner end of the half-ply 29 closest to the said circumferential center plane is equal to 0.10 $S_0$.

The protective reinforcement 34 which radially covers the working crown reinforcement 33 is identical to that in FIG. 2 and is formed by plies 31, 32.

By comparison with FIG. 2, the structure in FIG. 3 proposes continuous working plies which are wider, at least as far as the plies 25, 26, 28 are concerned. This difference in structure has the effect in particular of increasing the coupling surfaces between the continuous working plies and the working half-plies. This increase in the coupling surfaces between the plies allows the tire to be given greater resistance to slip angle forces.

This structure also proposes greater binding in the central zone than in the case of FIG. 2.

Moreover, the structure shown in FIG. 3 allows the flexibility of the crown to be increased in the center, since the half-ply 29 is further from the circumferential center plane than the half-ply 19 in FIG. 2.

FIG. 4 shows a diagrammatic illustration in radial section of a third crown structure according to the invention. According to this third illustration of the invention, the stack has plies 35 to 40 forming a working crown reinforcement 41 of a tire, this reinforcement being surmounted by a protective reinforcement 42.

The working reinforcement 41 comprises two axially continuous plies 35 and 36. These plies have respective theoretical widths $L_{35}$ and $L_{36}$ equal to 0.45 $S_0$ and 0.65 $S_0$, where as mentioned above $S_0$ is the maximum axial width of the carcass reinforcement when the latter is mounted on its operating rim and inflated to its recommended pressure.

These two continuous working plies are formed from non-extensible metal cords which are parallel to one another in each ply 35 and 36 and cross from one ply 35 to the next 36, forming theoretical minimum angles $\alpha_{35}$ and $\alpha_{36}$ respectively equal to −15° and +24° with the circumferential direction of the tire.

The working crown reinforcement 41 is then radially completed by superposing two half-plies 37, 38. As above, these two half-plies are located symmetrically with respect to the circumferential center plane on that part of the stack of the tire which is not shown. These two half-plies also have non-extensible metal cords which are parallel to one another and cross from the ply 37 to the ply 38 at theoretical minimum angles $\beta_{37}$, $\beta_{39}$ which are respectively equal to −18° and +34°.

The theoretical axial distance separating the radial plane from the inner end of the half-ply 37 closest to the said circumferential center plane is equal to 0.08 $S_0$.

The protective reinforcement 42 which radially covers the working crown reinforcement 41 is identical to that in the previous two examples, and is formed by plies 39, 40.

The essential difference from the two examples above is that the crown structure has only two continuous working plies. This embodiment allows greater flexibility at the center of the crown of the tire to be retained than in the previous cases.

These examples should not be interpreted restrictively, and there are numerous variant embodiments; it is in particular possible to provide for the working half-plies to be interposed between the continuous working plies. It is also possible to have three continuous working plies. It is also conceivable to invert the orientation of the cords of the protective plies.

The invention claimed is:

1. A tire for a heavy vehicle, comprising a radial carcass reinforcement radially surmounted by a working crown reinforcement, composed of at least two continuous working crown plies formed by metal reinforcing elements which cross from one ply to the next, forming angles α, α' of between 10° and 35° with the circumferential direction, the at least two working crown plies having different respective axial widths, wherein the working crown reinforcement is completed on each side of the circumferential center plane by at least two half-plies whereof the metal reinforcing elements form angles $\beta$, $\beta'$ greater than the smallest of the angles $\alpha$, $\alpha'$ with the circumferential direction, wherein axially outer ends of the half-plies are not radially aligned, and the half-ply extending farthest radially outwardly is in contact with the axially widest continuous working crown ply, and wherein the half-plies radially cover the axially outer end of said axially widest working ply.

2. A tire according to claim 1, wherein the continuous plies and the working half-plies are composed of non-extensible metal reinforcing elements.

3. A tire according to claim 1, wherein at least one of the half-plies has a zone covering the end of the narrowest crown ply.

4. A tire according to claim 1, wherein the reinforcing elements of one of the half-plies are at an angle at least 10° greater than the smallest of the angles $\alpha$, $\alpha'$.

5. A tire according to claim 1, wherein the reinforcing elements of the half-plies cross one another.

6. A tire according to claim 1, wherein the working crown reinforcement is completed by a protective reinforcement composed of at least two plies of resilient metal reinforcing elements.

7. A tire according to claim 6, wherein a protective ply is provided having an axial width greater than the width of the axially widest working ply.

8. A tire according to claim 6, wherein the radially outer protective ply has an axially outer end between the axially outer end of the half-ply extending axially least far outwards and the axially outer end of the widest continuous working ply.

9. A tire for a heavy vehicle, comprising a radial carcass reinforcement radially surmounted by a working crown reinforcement, composed of at least two continuous working crown plies formed by metal reinforcing elements which cross from one ply to the next, forming angles $\alpha$, $\alpha'$ of between 10° and 35° with the circumferential direction, wherein the working crown reinforcement is completed on each side of the circumferential center plane by at least two half-plies whereof the metal reinforcing elements form angles $\beta$, $\beta'$ greater than the smallest of the angles $\alpha$, $\alpha'$ with the circumferential direction, wherein axially outer ends of the half-plies are not radially aligned, and the half-ply extending farthest radially outwardly is in contact with the axially widest continuous working crown ply, and wherein the half-plies radially cover the axially outer end of said axially widest working ply, wherein the working crown reinforcement being completed by a protective reinforcement composed of at least two plies of resilient metal reinforcing elements; and the radially outer protective ply having an axially outer end disposed between the axially outer end of the half-ply extending axially least furthest outwards and the axially outer end of the widest continuous working ply.

* * * * *